United States Patent
Sitter

[15] 3,650,099
[45] Mar. 21, 1972

[54] LIMB SHAKER

[72] Inventor: Spencer B. Sitter, P.O. Box 415, McLean, Tex. 79057

[22] Filed: June 23, 1970

[21] Appl. No.: 49,077

[52] U.S. Cl. ...................................................56/328 TS
[51] Int. Cl. ..........................................A01g 19/00
[58] Field of Search ..........................56/328, 328 TS, 329

[56] References Cited

UNITED STATES PATENTS

| | | | |
|---|---|---|---|
| 1,623,497 | 4/1927 | Rurup | 56/328 TS |
| 2,542,665 | 2/1951 | Gustafson | 56/328 TS |
| 3,101,583 | 8/1963 | Ferguson | 56/328 TS |
| 3,132,458 | 5/1964 | Russell et al. | 56/328 TS |
| 3,174,269 | 3/1965 | Londo | 56/328 TS |
| 3,212,250 | 10/1965 | Aulabaugh et al. | 56/328 TS |
| 3,457,713 | 7/1969 | Plummer | 56/328 TS |
| 3,479,806 | 11/1969 | Pool et al. | 56/328 TS |

*Primary Examiner*—Russell R. Kinsey
*Attorney*—Charles W. Coffee

[57] ABSTRACT

A tree limb is vibrated to shake the fruit therefrom. A small lightweight internal combustion engine, such as is used for power saws, is used and it is isolated from the boom by a spring and the boom is isolated from the tree engaging finger by a second spring, thereby permitting the boom and limb to have a greater amplitude of movement than the reciprocating exciter of the engine assembly and also the limb engaging finger can move with respect to the boom to accommodate for different angles. The speed of the engine is adjusted to the natural frequency of the limb at which point the limb will have a large amplitude of vibration.

6 Claims, 4 Drawing Figures

INVENTOR:
SPENCER B. SITTER

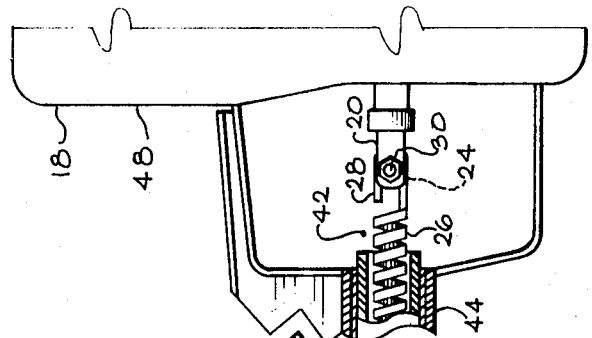
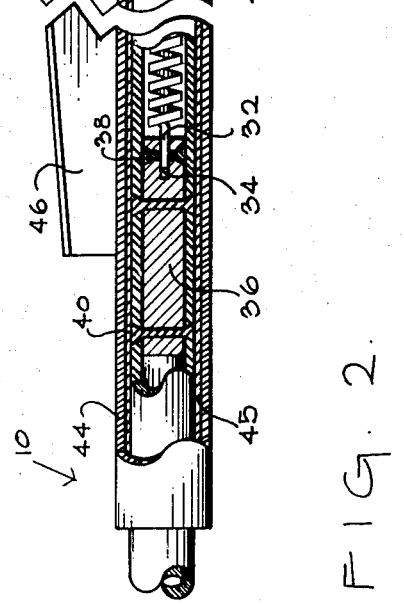
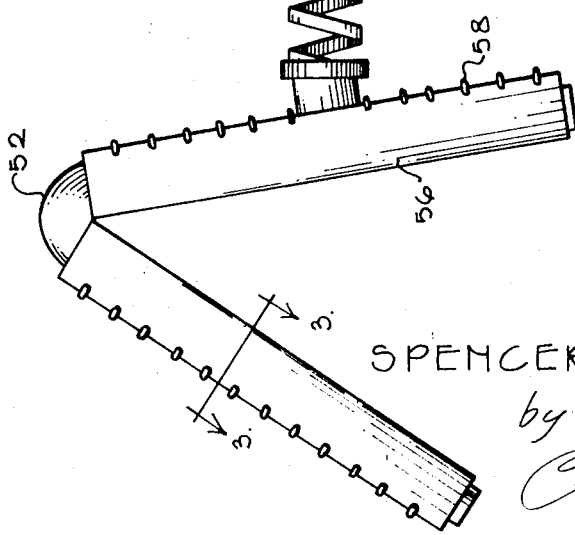

LIMB SHAKER

CROSS-REFERENCE TO RELATED APPLICATIONS

On June 23, 1970, I filed application Ser. No. 49,078 for Apron for Fruit Harvesting, which, together with the Limb Shaker disclosed herein, works together as a unit for harvesting the fruit.

BACKGROUND OF THE INVENTION

1. Field of the Invention

This invention relates to harvesting fruit by shaking the tree. As used in this paper, fruit means the edible product of trees. Specifically included in the fruit to be gathered are pecans, walnuts, plums, prunes, citrus fruits, peaches, apples, pears, cherries, olives, etc.

2. Description of the Prior Art

It is well known in the harvesting of fruit that a tree can be shaken, thereby removing the fruit from the tree. For example, Gould et al., U.S. Pat. No. 3,120,091, discloses a tractor-mounted boom which engages the tree and shakes it to shake the fruit from it.

Londo, U.S. Pat. No. 3,174,269, discloses a small vibrator for shaking only one limb of a tree, utilizing an internal combustion engine as is used for power saws. Other examples of the prior art are shown in Pool et al., U.S. Pat. No. 3,479,806; Plumber, U.S. Pat. No. 3,457,713, and Mays et al., U.S. Pat. No. 3,138,912.

SUMMARY OF THE INVENTION

New and Different Function

I have invented a tree shaker which utilizes the natural period of vibration of the tree limb, thereby enabling the effective shaking to be done with much less power; therefore, with a much smaller and lighter engine. Specifically, a variable speed engine is used so that the finger of the shaker engages the limb and then is excited with vibrations until the limb begins to vibrate vigorously, which will indicate the natural frequency. The limb will shake much more excessively than the exciter of the engine. This is possible because of a resilient linkage between the exciter and the boom, also, there is a second smaller resilient link between the boom and the limb engaging finger. The vibration of the boom is axial.

Objects of this Invention

An object of this invention is to harvest fruit from trees.

Another object is to harvest fruit by shaking the individual limbs with a small, lightweight engine wherein the limb vibrates with a greater amplitude than the engine exciter.

Other objects are to achieve the above without damage or injury to the tree.

Further objects are to achieve the above with a device that is sturdy, compact, durable, lightweight, simple, safe, efficient, versatile, and reliable, yet inexpensive and easy to manufacture, operate, and maintain.

Still further objects are to achieve the above with a method that is versatile, rapid, efficient, and inexpensive, and does not require skilled people to adjust, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING:

FIG. 2 is an enlarged elevational view of the shaker with portions broken away and shown in section.

FIG. 3 is an enlarged sectional view taken along line 3—3 of FIG. 2.

CATALOG OF ELEMENTS

Figure 1:
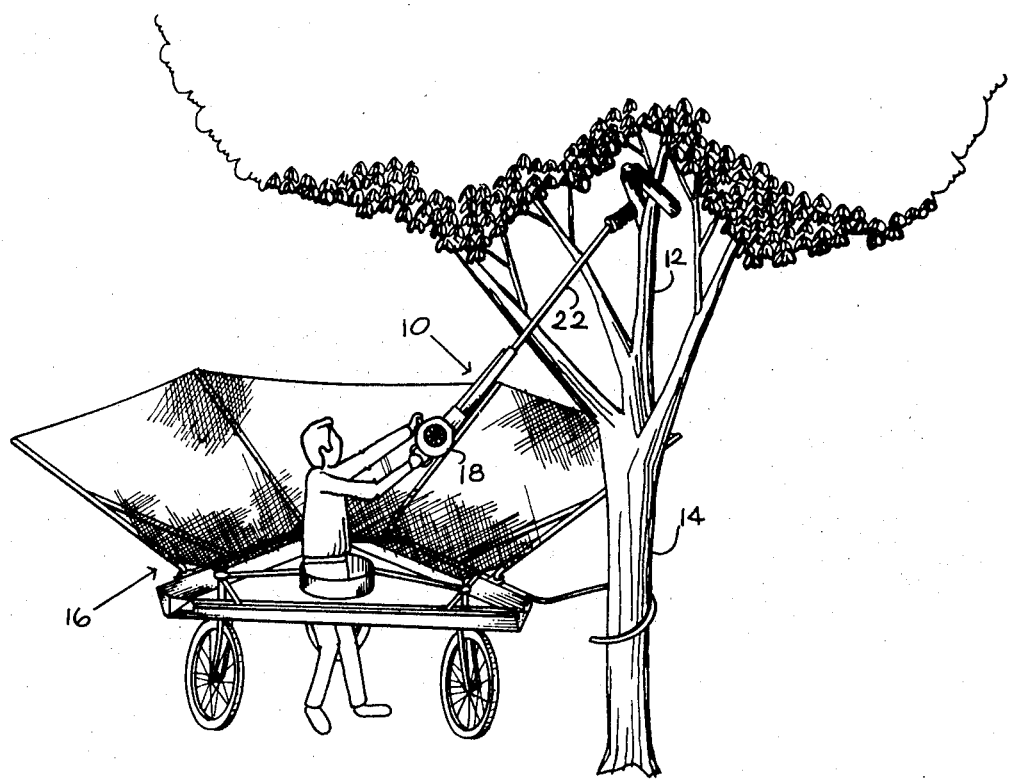
FIG. 1 is a perspective view of an embodiment of this invention in use by a man with a fruit catcher or apron.
Figure 4:
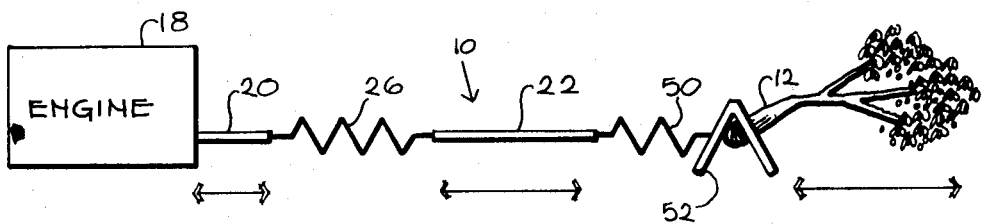
FIG. 4 is a schematic representation of the invention.

| | |
|---|---|
| 10 | Shaker |
| 12 | limb |
| 14 | tree |
| 16 | catcher |
| 18 | engine |
| 20 | exciter |
| 22 | boom |
| 24 | slot |
| 26 | spring |
| 28 | end |
| 30 | stud |
| 32 | boom end |
| 34 | slot |
| 36 | stub |
| 38 | stud |
| 40 | screws |
| 42 | space |
| 44 | sleeve |
| 46 | flange |
| 48 | body |
| 50 | wrist spring |
| 52 | finger |
| 54 | tubing |
| 56 | tire |
| 58 | wires |

DESCRIPTION OF THE PREFERRED EMBODIMENT

Shaker 10 is designed to be held in the hands of the operator and to shake limb 12 of tree 14 to cause the fruit to fall into catcher 16. Although any type catcher could be used, the catcher which is disclosed in application Ser. No. 49,078 is preferred. Shaking the fruit from the limb onto the ground and picking it up by hand is an operable procedure.

The shaker 10 uses internal combustion engine 18 for the power. According to the developed technology of the present time, the only commercial source of power which is sufficiently lightweight to be comfortably carried in the hands of the operator is a gasoline powered internal combustion engine as is commonly used for power saws. However, it is entirely according to my invention that other sources of power could be used such as electrical motors or fluid motors, either hydraulic or air pressure, or even stored animal power such as a wound spring. According to the present state of technology to have the mobility desired for this harvester, an electrical generator to supply electrical energy for an electrical motor would be undesirable or an air compressor or hydraulic pump to supply the energy to a fluid motor is not desirable; likewise, with the wound spring is not desirable.

The engine 18 is connected to exciter 20. Thus it may be seen that engine 18 is a power means connected to the exciter 20 for vibrating the exciter and this vibration is in a direction aligned with the longitudinal axis of elongated boom 22. The details of the connection between the engine 18 and the exciter 20 have not been shown in the drawings because such a transmission and vibrating mechanism is well within the skill of those trained in the art. For example, Londo, supra, shows one means of achieving this. My preference is to purchase engine assemblies for power saws having reciprocating blades. Such units are commercially available on the market, vibrating the exciter 1 7/16 inch stroke.

The frequency of the period or the speed of the exciter 20 vibration must be adjustable. This is another reason I prefer to use an internal combustion engine for power means 18 because they are readily adaptable by throttle setting to have adjustable speed output.

The exciter 20 is a cylindrical shaft which has slot 24 therein. Helical spring 26, which is a resilient member, has flat exciter end 28 inserted into the slot 24 and held securely in place by stud 30. The other end of the spring 26 is called boom end 32 and is inserted within slot 34 of stub 36 and held securely in place by stub stud 38. It may be seen that stub stud 38 is shaped so that the stub 36, including the stud, has a cylindrical outline. The stub 36 is telescoped within the boom 22 and held in place by screws 40. The spring 26 transmits both compression and tension. The majority of the length of the spring 26 is telescoped within or covered by boom 22. There is space 42 between the end of the boom 22 and the exciter 20. Therefore, the boom can have a greater amplitude of vibration than the amplitude of the exciter 20. The boom 22 is telescoped within sleeve 44 which is rigidly attached by flange 46 to body 48 of the engine unit 18. It will be obvious to those skilled in the mechanical arts that they may insert a bushing 45 of suitable material between the sleeve 44 and the boom 22 to reduce friction, as may be seen in the drawing. Thus the boom 22 is mounted for rectilinear reciprocation aligned with its axis.

One end of wrist spring 50 is attached to boom 22 by any convenient means and the other end of the wrist spring 50 is attached to V-shaped finger 52 by any convenient means. The "axis" or "median" of the V-shaped finger is normal to the axis of the boom 22 and the V-shaped finger 52 lies in the same plane as the boom 22. The spring 50 is connected to the V-shaped finger about midway of one of the legs of the V. The drawing is specifically referred to for the particular arrangement of parts in this area. The V-shaped finger 52 is made of tubular metal and is covered by a resilient covering. I have found that it is desirable to cover the rubber tubing 54 with a tough, resilient material, which is also flexible. I have found that bicycle tires 56 are ideally suited for this. They can be slipped over and held in place by wires 58 through the sidewall so that the beads are pulled together with the wires. Bicycle tires are suitable for this because they are readily available in all parts of the world and they are tough and resilient and still flexible.

One of the specific purposes for which the shaker 10 is designed is for the harvesting of olives, and olive trees are valuable. It is important not to harm an olive tree as by scarring the branches. When the limb is vibrated, there is violent movement of fingers 52 in contact with the limb 12. Therefore, It is desirable that the fingers 52 not beat the limb or otherwise harm it. Also, in this connection, the main purpose for wrist spring 50, although it is a resilient connection between the boom 22 and the finger 52, is not for the vibratory effect, but for the fitting effect. I.e., the fingers can make a snug, secure contact with the limb 12, even though the boom may not be in good position with respect to the limb. More often than not, probably, the boom 22 will not be at right angles to the limb 12, however, because of the wrist spring 50, which is a helical spring, the finger 52 can twist and move so that it is at right angles to the limb and will fit securely thereon.

OPERATION

Normally the engine unit with the internal combustion engine 18 will have a speed responsive clutch; therefore, the operator of the limb shaker 10 can start the engine and have it running at slow speed without the exciter 20 vibrating. The person holding the shaker in his hands can then raise the finger 52, placing it over the limb 12 to be shaken to harvest the fruit therefrom. With it in place, the operator increases the speed of the engine 18 until the clutch engages which will cause the exciter 20 to reciprocate. The reciprocation or vibration of the exciter 20 will be transmitted through the resilient member which is the spring 26 to the boom 22. Normally, the boom is connected with only medium resilience to the limb 12. Normally the boom and the limb will vibrate with approximately the same amplitude and, generally, the amplitude of vibration of the limb and the boom will be less than the amplitude of the vibration of the exciter 20. The operator increases the speed of the engine 18 by advancing the throttle or by whatever speed control means are provided. When the speed of the engine vibrates the exciter 20 at a frequency which matches the natural frequency of vibration of the tree limb 12, the limb will vibrate violently. At about the natural frequency of the tree limb 12, the amplitude of vibration of the limb and the boom 22 will be greater than the amplitude of vibration of the exciter 20. I.e., the exciter 20 does not vibrate or shake the limb by excessive force, but it excites vibration into the limb at the natural frequency of the limb; therefore, it is the resilience of the limb 12 which causes it to vibrate all by itself with the exitation from the exciter 20. For this reason, a very small amount of power is required to shake the limb; therefore, an extremely lightweight engine 18 is usable.

When the natural frequency of the limb 12 is reached, the limb will shake violently and all fruit on it will shake free of the limb and fall downward, responsive to earth's gravity. Thereafter, the throttle and the speed of the vibration can be reduced until the clutch disengages and the exciter 20 no longer vibrates and the fingers 52 removed from the limb and then moved to the next limb where it is engaged and vibrated at its natural frequency to deliver the fruit from it.

Those familiar with vibrations will recognize that it is difficult to predict exactly how vibrations will work and the effect of resiliency and damping the resiliency in the various parts of the vibratory system. In the embodiment described, through experimentation it is found desirable that sometimes spring 26 not be entirely free from damping action. Specifically, I have found in certain instances with certain trees, it is desirable to fit a rubber plug within the spring 26. I.e., the external diameter of the cylindrical rubber plug is slightly larger than the inside diameter of the spring 26. Therefore, with the rubber plug fitted into it, there is certain friction and change in the resilience between the spring 26; therefore, certain changes in the resiliency and damping action with which the vibration is transmitted from the exciter 20 to the boom 22. Although it seems that in certain cases it increases the vibration upon the limb; however, it may be that this merely broadens the frequency range of which sympathetic vibrations are obtained. It is believed that if there is no damping in the natural wood of the tree limb 12, there is a very narrow range of frequency of which there is a natural vibratory response and the speed of the engine 18 must be very precisely matched to this natural frequency of vibration. However, if more damping is introduced, the frequency range of natural vibration is increased so that the speed of the engine is not so critical.

The embodiment shown and described above is only exemplary. I do not claim to have invented all the parts, elements or steps described. Various modifications can be made in the construction, material, arrangement, and operation, and still be within the scope of my invention. The limits of the invention and bounds of the patent protection are measured by and defined in the following claims. The restrictive description and drawing of the specific example above do not point out what an infringement of this patent would be, but are to enable the reader to make and use the invention.

SUBJECT MATTER CLAIMED FOR PROTECTION

I claim as my invention:
1. In a limb shaker having
   a. a finger for engaging a limb of a tree,
   b. an elongated boom connected to the finger,
   c. an exciter connected to the boom, and
   d. power means connected to the exciter for vibrating the exciter in a direction aligned with the longitudinal axis of the boom;
   e. the improvement comprising:
   f. a resilient member interconnecting the exciter to the boom.
2. The invention as defined in claim 1 with the additional limitation of
   g. a resilient member interconnecting the boom to the finger.
3. The invention as defined in claim 1 with the additional limitation of
   g. means connected to the power means for changing the frequency of vibration of the exciter.
4. The invention as defined in claim 3 with the additional limitation of h. a resilient member interconnecting the boom to the finger.

5. In a limb shaker having
a. a finger for engaging a limb of a tree,
b. an elongated boom connected to the finger,
c. an exciter connected to the boom, and
d. power means connected to the exciter for vibrating the exciter in a direction aligned with the longitudinal axis of the boom;
e. the improvement comprising:
f. a resilient member interconnecting the boom to the finger.

6. The invention as defined in claim 5 with the additional limitation of
g. means connected to the power means for changing the frequency of vibration of the exciter.

* * * * *